Oct. 17, 1950     M. PACCIANO, JR     2,526,498
REFRIGERATED MEAT GRINDING MACHINE
Filed Feb. 19, 1949
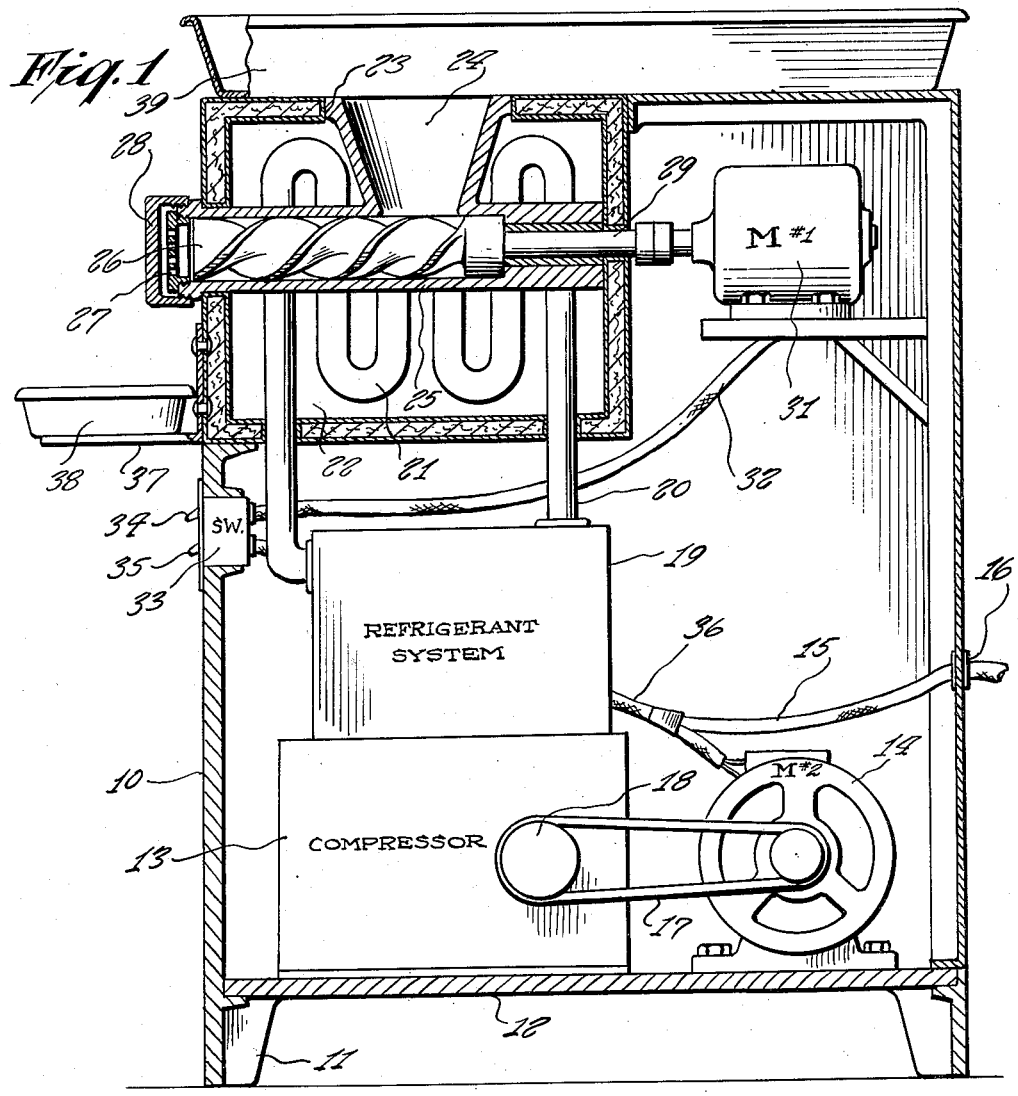
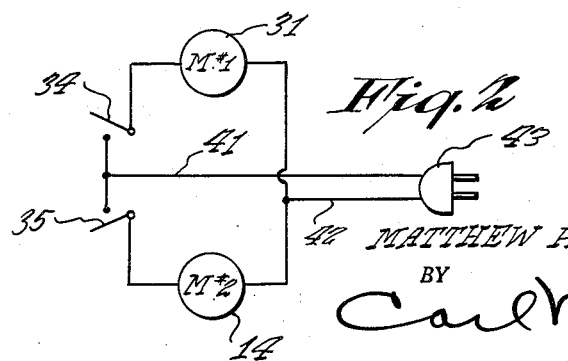
INVENTOR.
MATTHEW PACCIANO, JR.
BY Carl Miller
ATTORNEY Patented Oct. 17, 1950

2,526,498

UNITED STATES PATENT OFFICE 2,526,498

REFRIGERATED MEAT GRINDING MACHINE

Matthew Pacciano, Jr., Brooklyn, N. Y.

Application February 19, 1949, Serial No. 77,305

1 Claim. (Cl. 62—1)

This invention relates to a refrigerated meat grinding machine.

In the various meat stores throughout the country, meat grinding machines are usually kept in the meat storage box out of the customer's view. A customer orders the meat of a special piece and the clerk in the storage box grinds up the same within the storage box and out of the view of the customer. The customer has no way of checking to see whether or not the special piece of meat asked for is ground for her.

In the smaller markets the grinding machine is not inside the storage box. There is always a certain amount of meat left in the machine between grindings which has a tendency to decay and change in color due to the store temperature which is usually too high to keep meat cool enough to maintain its composure and freshness. The store keeper often fails to thoroughly clean this machine from day to day and as a result, each pound of meat which is ground receives some of the decayed or discolored meat.

It is accordingly the object of the present invention to provide a refrigerated meat grinder which can be used within view of the customer and wherein the meat will be prevented from decaying or being discolored.

Other objects of the present invention are to provide a refrigerated meat grinder which is of simple construction, easy to operate, inexpensive to manufacture, compact, and efficient in operation.

For other objects and for a better understanding of the invention, reference may be had to the following detailed description taken in connection with the accompanying drawing, in which:

Fig. 1 is a sectional view, in elevation, of a refrigerated meat grinding machine embodying the features of the present invention.

Fig. 2 is a wiring diagram of the electric motor system and the switches for controlling the motor circuits.

Referring now particularly to Fig. 1, 10 represents a housing having bottom feet portions 11 and a bottom 12 elevated upon the feet portions. Supported on the bottom 12 is a compressor 13 operated by an electric motor 14 connected by cables 15 to some external source. The cables 15 extend out of the rear wall of the housing as indicated at 16. A pulley belt 17 connects the electric motor 14 with a pulley 18 of the compressor. On top of the compressor is a refrigerant system 19 which is connected by suitable piping 20 to a cooling coil 21 disposed in an insulated chamber 22. The top of the insulated chamber has an opening 23 receiving the mouth portion 24 of a meat grinder casing 25 having a screw 26 for forcing the meat through an extruding member 27. This casing 25 extends through the wall of the refrigerated chamber and also carries a cap 28 which can be placed over the casing when the machine is out of use so as to prevent an exposure of such meat located upon the extruding member 27 and to keep the meat cool thereover as a result of the air within the casing 25 being kept cooled. The casing 25 will be thoroughly cooled because of its location within the cooling chamber 22. A shaft 29 extends through the insulated chamber wall and is connected to a motor 31. The motor 31 has a cable 32 extending to a multiple switch 33 having buttons 34 and 35. A cable 36 connects with cable 15 and with the electric motor 14. By operation of switch button 34, the meat grinder motor can be turned on or off. By operation of the switch button 35, the refrigerant motor 14 can be turned on or off. The refrigerant is circulated from the casing 19 and through the cooling coil to keep the cooling chamber 22 at a low temperature sufficient to keep all small portions of the meat which may remain in the grinder from decaying. On the exterior of the housing is a shelf 37 on which a dish 38 may be rested to collect the meat which is extruded from the machine. A large tray 39 normally always rests on the top of the housing and serves as a cover for the opening or mouth 24 when the grinder is not in use. It has a sliding door with a handle which is opened when meat is deposited in the machine and is closed when not in use, thus keeping the cool air from escaping from mouth 24.

Fig. 2 shows the electric circuit including switches 34 and 35, a common wire 41 connected through the switches with the electric motors 14 and 31. A second wire 42 along with the wire 41 connects with an electrical terminal or plug 43 which may be inserted in a wall receptacle to make the machine ready for use.

While various changes may be made in the detail construction, it shall be understood that such changes shall be within the spirit and scope of the present invention as defined by the appended claim.

Having thus set forth and disclosed the nature of my invention, what is claimed is:

The combination of a meat grinder with a refrigerating unit having cooling coils, comprising an electric motor for operating the refrigerating unit including switch means for controlling the operation of the electric motor, a housing receiving said refrigerating unit, an insulated chamber in said housing, said cooling coils extending from said refrigerating unit into said insulated chamber, a meat grinder casing disposed in said insulated chamber and having one end extending through the wall of the latter, said casing having a mouth extending in upper direction through the top wall of said insulated chamber, a meat tray disposed on top of said casing and closing the said mouth thereof, and an extruding member supported in said casing outside of the insulating wall, a screw disposed rotatably in said casing, a second electric motor disposed in said housing and a shaft of the last mentioned motor connected with said screw and switch means for controlling the said second electric motor.

MATTHEW PACCIANO, Jr.

REFERENCES CITED

The following references are of record in the file of this patent:

UNITED STATES PATENTS

| Number | Name | Date |
|---|---|---|
| 2,060,605 | Biancalana | Nov. 10, 1936 |
| 2,109,560 | Willison et al. | Mar. 1, 1938 |